United States Patent
Cartwright et al.

(10) Patent No.: US 10,788,357 B2
(45) Date of Patent: Sep. 29, 2020

(54) SELF-STANDING WEIGHING SCALE

(71) Applicant: ILLINOIS TOOL WORKS INC., Glenview, IL (US)

(72) Inventors: Kevin R. Cartwright, Birmingham (GB); Ian D. Taylor, Warwickshire (GB); Anita Brinsdon, Birmingham (GB); Robert Dieterman, Worcestershire (GB); Hugh A. Connell, Worcestershire (GB)

(73) Assignee: ILLINOIS TOOL WORKS INC., Glenview, IL (US)

( * ) Notice: Subject to any disclaimer, the term of this patent is extended or adjusted under 35 U.S.C. 154(b) by 228 days.

(21) Appl. No.: 15/928,721

(22) Filed: Mar. 22, 2018

(65) Prior Publication Data
US 2019/0265096 A1    Aug. 29, 2019

(30) Foreign Application Priority Data

Feb. 23, 2018  (GB) .................................. 1802966.0
Feb. 27, 2018  (EP) .................................... 18158932

(51) Int. Cl.
*G01G 21/18* (2006.01)
*G01G 21/22* (2006.01)
*G01G 21/23* (2006.01)

(52) U.S. Cl.
CPC ............. *G01G 21/18* (2013.01); *G01G 21/22* (2013.01); *G01G 21/23* (2013.01)

(58) Field of Classification Search
CPC .......... G01G 21/18; G01G 21/22; G01G 21/23
See application file for complete search history.

(56) References Cited

U.S. PATENT DOCUMENTS

| | | | | |
|---|---|---|---|---|
| 4,669,029 A | * | 5/1987 | Svenson | H05K 5/0204 177/143 |
| 4,799,562 A | * | 1/1989 | Burrows | G01G 3/1402 177/144 |
| 5,319,817 A | * | 6/1994 | Hay | A61G 7/1019 16/327 |
| 7,598,464 B2 | * | 10/2009 | Deng | A47J 43/0716 177/144 |
| 7,626,130 B2 | * | 12/2009 | Scholpp | G01G 15/00 177/238 |
| 8,304,669 B2 | * | 11/2012 | Duppre | G01G 11/003 177/126 |
| 9,522,414 B2 | * | 12/2016 | Yamakawa | G01G 19/03 |
| 9,995,619 B2 | * | 6/2018 | Parker | G01G 19/18 |
| 2019/0339115 A1 | * | 11/2019 | Smith | B62B 3/12 |

OTHER PUBLICATIONS

Satwik Weighing Scale, ABS Table Top product information, published Apr. 26, 2011, 2 pages.

* cited by examiner

*Primary Examiner* — Randy W Gibson
(74) *Attorney, Agent, or Firm* — Thompson Hine LLP (57) ABSTRACT

A weighing scale includes a case for housing electrical components; a load cell; a carriage coupled to the load cell, wherein the carriage is configured for receiving a weighing plate; wherein the at least a portion of the carriage extends over the case.

19 Claims, 5 Drawing Sheets

Front View

Side View

Fig. 4a

Exploded View

Fig. 4b

Exploded View

Fig. 5

SELF-STANDING WEIGHING SCALE

TECHNICAL FIELD

The present application relates to weighing scales. In particular the present application is concerned with weighing scales (such as, although not exclusively, weighing scales for retail stores) provided with the purpose of being repositionable within a store.

BACKGROUND

Weighing scales are widely used to accurately measure the weight of goods so that an appropriate price may be assigned to the specific measured weight of goods. Modern weighing scales in retail stores and other venues, that are required to accurately measure the weight of goods, commonly use load cells to measure the weight of goods. Load cells typically comprise one or more strain gauges that deform when a load (e.g. produce to be weighed) is placed upon the weighing scale. As the strain gauges deform they send out an electrical signal corresponding to an uncompensated weight value.

Typically, weighing scales for use in retail environments comprise two types of load cell. Firstly, tension load cells designed to measure tensile or 'pulling' loads can be used in hanging scales where a weighing plate for holding produce is suspended below the load cell. Secondly, compression load cells, designed to measure compression or 'pushing' loads are used in standing scales where a weighing plate is directly above the load cell. In some systems such as retail checkouts, the area directly below a weighing plate is occupied by an optical sensor rather than a compression load cell. In these types of systems, it is not ideal to mount a compression load cell below the optical sensor due to the sensors comprising vibrating components which can negatively impact on the precision of the load cell. Instead a third type of load cell can be used, a beam load cell. The location of the beam load cell can be offset away from the centre of the weighing plate (as required for compression load cells) enabling optical sensors to be placed there instead. In order to provide a weighing plate of sufficient size to hold expected loads, the load cells in traditional scales are housed in cases having the same plan footprint as the weighing plate. There is a need in retail environments to reduce the plan footprint of any electronic devices as the demand for counter-space is high. Conventional weighing scales that reduce the footprint of the case of the weighing scale while incorporating the traditional compression load cells are at the expense of increased height of the weighing scale—i.e. the number and volume of components does not change therefore the height of the scale must increase if the plan footprint has decreased.

The accuracy of the weight measurements from any type of load cell is dependent on a number of factors including but not limited to the inclination of the load cell. If at any time, the weighing scale is tilted off horizontal, the raw weight value of an applied load as measured by the load cell becomes less than the actual weight value if the applied load is measured on the horizontal. As such, weighing scales are commonly placed on flat surfaces and/or have mechanisms such as adjustable feet to level the scale if needed. GB2469823 A (Illinois Tool Works, Inc) 3 Nov. 2010 describes a weighing apparatus comprising a load cell and an inclinometer and a method of weighing with and calibrating the weighing apparatus that tilt-compensates for component parts of load cell' readings that vary according to different relationships with load cell inclination; therefore, addressing the problem of tilt. Other factors that may affect the weight readings is the change in the gravitational constant 'g' with location. When a scale is moved from one location to another it may enter a different 'gravity zone' and as such may need to be recalibrated at the new site. Typically, a person appointed or qualified under trading standards or other government regulations can be required to visit an operational site of the weighing scale, calibrate the scale and give an official seal to the weighing scale once calibrated.

Within retail environments there is a need to provide a weighing scale that may be positioned in different locations throughout stores so as to adapt to different configurations of store. Conventional weighing scales draw power from a mains-supply, therefore their re-position-ability in a store is confined to a radius from the nearest mains-power outlet, this range can obviously be extended by power-extension leads.

While some weighing scales are configured for use by a trained store employee, there are others that are configured as self-service scales; self-service scales enable customers to weigh produce, allowing the customer to select the quantity of produce desired without the need for an employee to be present. Such self-service scales are also commonly provided with label printers to appropriately distinguish the type and weight of produce to reduce time at the checkout and improve overall customer satisfaction. Given that, for a substantial portion of the weighing scale's operational lifespan, there will be no train store employee adjacent to a self-service scale, there is need to provide an operationally robust weighing scale such that untrained customers can easily operate it. Such a scale requiring to be placed in an accessible region of a store close to the produce or goods for weighing; must be resilient to events such as knocking without the events affecting the calibration of the weighing scale.

SUMMARY

The present invention provides a compact weighing scale comprising: a case for housing electrical components; a load cell; a carriage coupled to the load cell, wherein the carriage is configured for receiving a weighing plate; wherein at least a portion of the carriage extends over the case.

In an option of the present invention, the carriage is arranged to support a weighing plate above the case such that the weighing plate is spaced apart from an upper surface or wall of the case. The spacing between the weighing plate or pan and the upper surface or wall of the case is such to allow the load cell to freely deform when a load is placed on the weighing pan, i.e. the spacing allows the carriage to freely deflect and the deflection is transferred to deform the load cell coupled to the carriage. In a further option, the carriage comprises at least one arm extending from the load cell. A cradle can be coupled to the at least one arm. Said cradle comprises an aperture for locating the weighing plate onto the cradle. In an option of the present invention, the load cell is a cantilever load cell.

In an option of the present invention the aperture comprises a retaining system for interlocking with a locating pin of the weighing plate. The weighing plate retaining system comprises at least one resilient member configured for receiving the locating pin of the weighing plate. In an option of the present invention, the least one resilient member comprises spaced apart substantially parallel resilient members.

In an option of the present invention a movable weighing apparatus is provided comprising: the weighing scale of any preceding claims mounted on a pedestal; wherein the pedestal comprises movement means configured to enable the weighing apparatus to be moved from one location to another. In a further option of the present invention, the movable weighing apparatus comprises a retractable stabilising device to prevent motion of the weighing apparatus.

Other features of the present invention are as claimed in the claims or as described in the description.

BRIEF DESCRIPTION OF THE DRAWINGS

Further preferred features and aspects of the present invention will be apparent from the claims and the following illustrative description made with reference to the accompanying drawings in which:

DETAILED DESCRIPTION

The following describes a preferred example of how to embody different aspects of this invention. This example is not intended to limit the scope of the invention as it may be feasible to implement the present invention in other ways without departing from the inventive concept of the invention as defined in the claims.

The present invention is directed towards weighing scales, in particular for retail outlets such as supermarkets.

A weighing scale in its simplest form comprises a load cell that is coupled to a carriage for supporting a weighing pan or weighing plate. A weighing plate can be provided that is received by and detachable from the weighing plate carriage to allow for storage, maintenance as well as other operational considerations. A load to be measured is then placed on the weighing plate, and a processor converts the raw readings from the load cell to a raw weight reading. The raw weight reading is compensated for the weight of the carriage and the weighing plate so as to determine the measured weight of the load or goods placed on the weighing pan.

Figure 1:
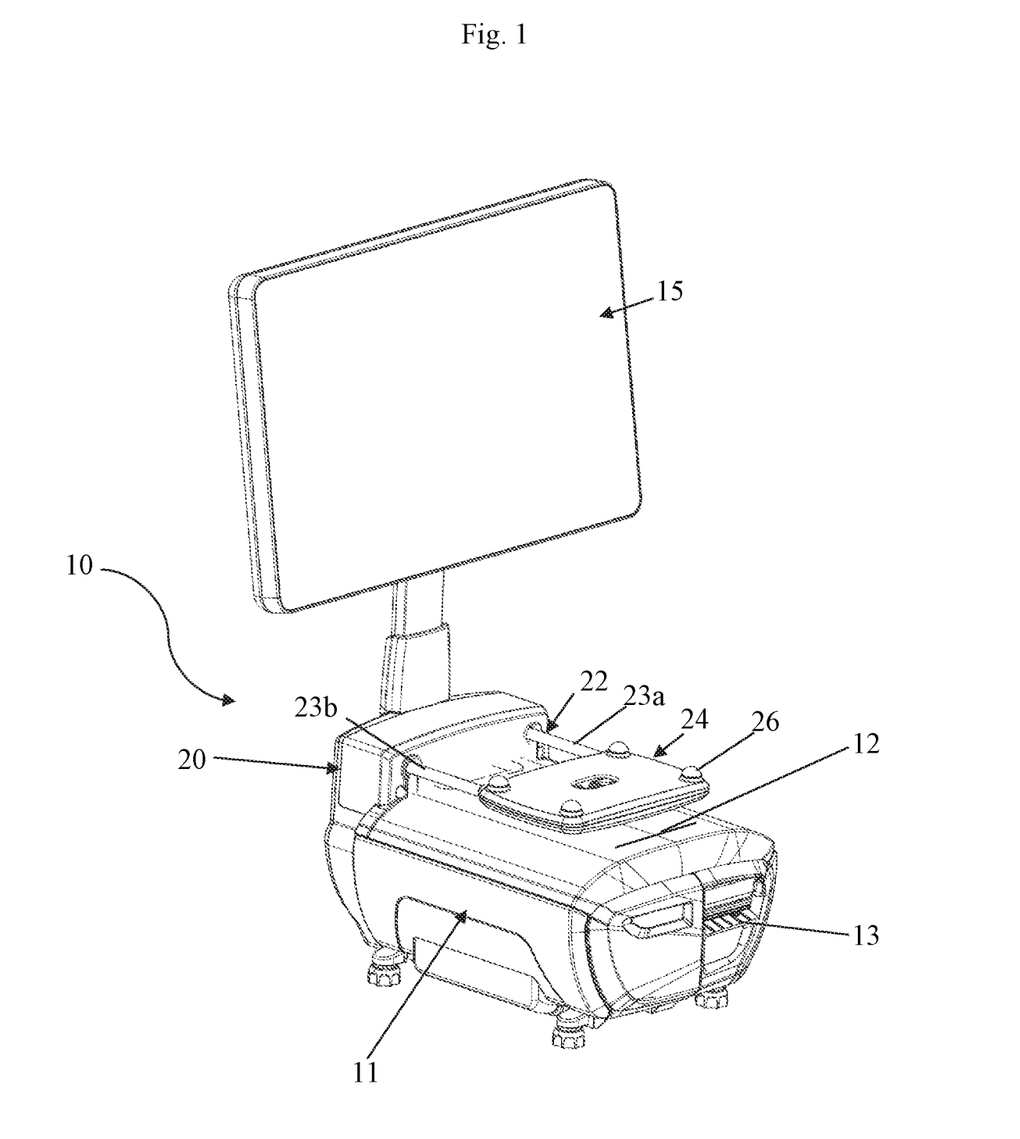
FIG. 1 is an isometric representation of the weighing scale according to an option of the present invention.

According to a first aspect of the present invention, as depicted in FIG. 1, a weighing scale 10 comprises a case 11 for housing electrical components. Said electrical components can include but are not limited to a processor for managing the operation of the weighing scale (for example a personal computer), electronic storage, analogue to digital converter e.g. RAM and a printer 13. The weighing scale can comprise a user interface system 15; said system can include but is not limited to a screen and an input device—for example a keypad or a touch sensitive screen. The screen provides a means for displaying information for example on produce, operational status of weighing scale (such as power reserves) and on weighing scale status or set up. Said printer in electronic communication with the managing processor can be mounted within the case or external to the case.

The electrical components of the weighing scale of the present invention can also comprise an inclinometer (as described for example in GB2469823 A (Illinois Tool Works, Inc) 3 Nov. 2010) whereby the processor coupled to the inclinometer is configured to convert the inclinometer readings to measure the tilt (or to take a measurement after a movement of the weighing apparatus) of the weighing scale. The tilt of the weighing scale is continually or periodically measured by the processor so to dynamically adapt for errors introduced by the load cell being tilted from horizontal which results in an inaccurate uncompensated weight reading when the weighing scale is moved from one location to another. Such a weighing scale compensates for any undesirable tilt of the load cell and thereby, ensures accurate measurement and valuation by a retailer of produce or goods even when the weighing scale is located on an uneven terrain or surface.

The weighing scale comprises a load cell 20 for example a cantilever load cell, options of such load cell include but are not limited to the Avery T103D. The load cell is mounted either externally or internally to the case. The load cell is coupled to a carriage 22, said carriage is configured for supporting a weighing plate on which a load for weighing can be placed. The load cell is configured to deform when a load is applied to the carriage. At least a portion of the carriage is external to the case and extends over or across the case. In an option of the present invention, the at least one portion of the carriage extends over an upper surface or wall of the case.

The carriage as shown in FIG. 1 is arranged to support a weighing plate over the case such that the weighing plate is spaced apart from an upper surface or wall 12 of the case. The spacing between the weighing plate or pan and the upper surface or wall of the case is such to allow the load cell to freely deform when a load is placed on the weighing pan. In practice, the carriage deflects and the deflection is transferred to deform the load cell coupled to the carriage. The spacing allows the carriage to freely deflect when a weight is placed on the weighing plate or pan. The load cell can be adjacent to the weighing plate when received on the carriage, such the overall height of the weighing scale is less than the height of an equivalent weighing scale comprising a load cell mounted below a weighing plate whilst still maintaining a small plan-foot print. Moreover, the load cell can freely deform when taking weight measurement without being constrained by the height of the casing. In an option of the present invention, the carriage comprises at least one arm extending from the load cell. The at least one arm extends from the load cell such that the least one arm is spaced apart from the upper surface or wall 12 of the case. A cradle 24 can be coupled to the at least one arm 23 of the carriage; the cradle is adapted for receiving the weighing plate. In the option of the present invention as depicted in FIG. 1, the carriage comprises a first and a second arm wherein the cradle is coupled between the first arm 23a and the second arm 23b. In an option of the present invention, the cradle is coupled to the distal end or free end of the at least one arm.

In an option of the present invention, the cradle and carriage are formed as a single unitary piece. In an option of the present invention, the cradle is formed by 3D printing. The cradle and/or the carriage can comprise any material with sufficient rigidity to transfer load from a received weighing plate or weighing pan to the load cell, such as plastics or metals.

Figure 2:
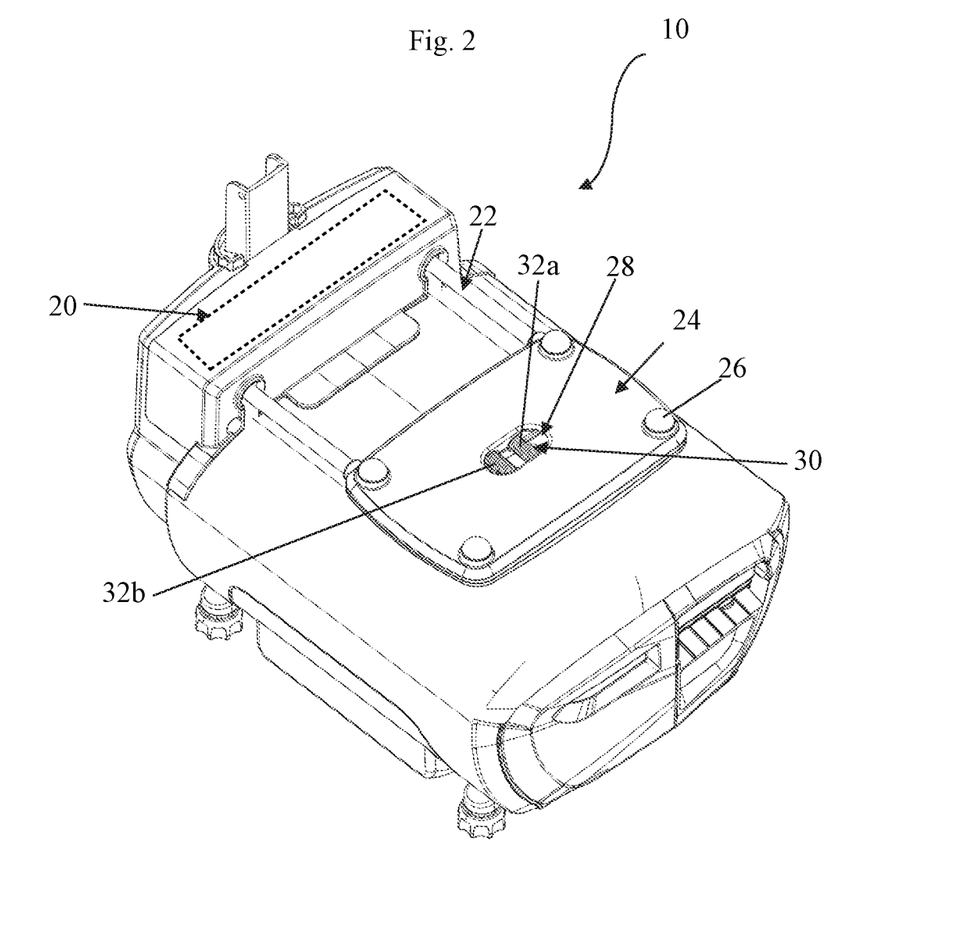
FIG. 2 is an isometric representation of the weighing scale, in absence of a screen, according to an option of the present invention.

In an option of the present invention, as shown in FIG. 2, said cradle can comprise at least one upwardly extending resting pin 26 for stabilising the weighing plate onto the cradle. In an option of the present invention, the cradle comprises an aperture 28 for locating the weighing plate onto the cradle. Said aperture can comprise a weighing plate retaining system 30 for engaging, e.g. interlocking, with a locating pin 37 of the weighing plate. Said retaining system can comprise at least one resilient member 32 configured for receiving the locating pin 37 of the weighing plate. Optionally, the at least one resilient member can comprise a rubberised material with an aperture for receiving the locating pin. In an option of the present invention depicted in FIG. 2, the at least one resilient member comprises spaced apart substantially parallel resilient members 32a, 32b, e.g. springs. The parallel resilient members are arranged such that a locating pin is received between the members. In an option of the present invention, the resilient members deform when the locating pin of the weighing plate is inserted between the members. The members are arranged in the cradle so that a locating member is received substantially perpendicular to the major axis of the parallel resilient members.

Figure 3:
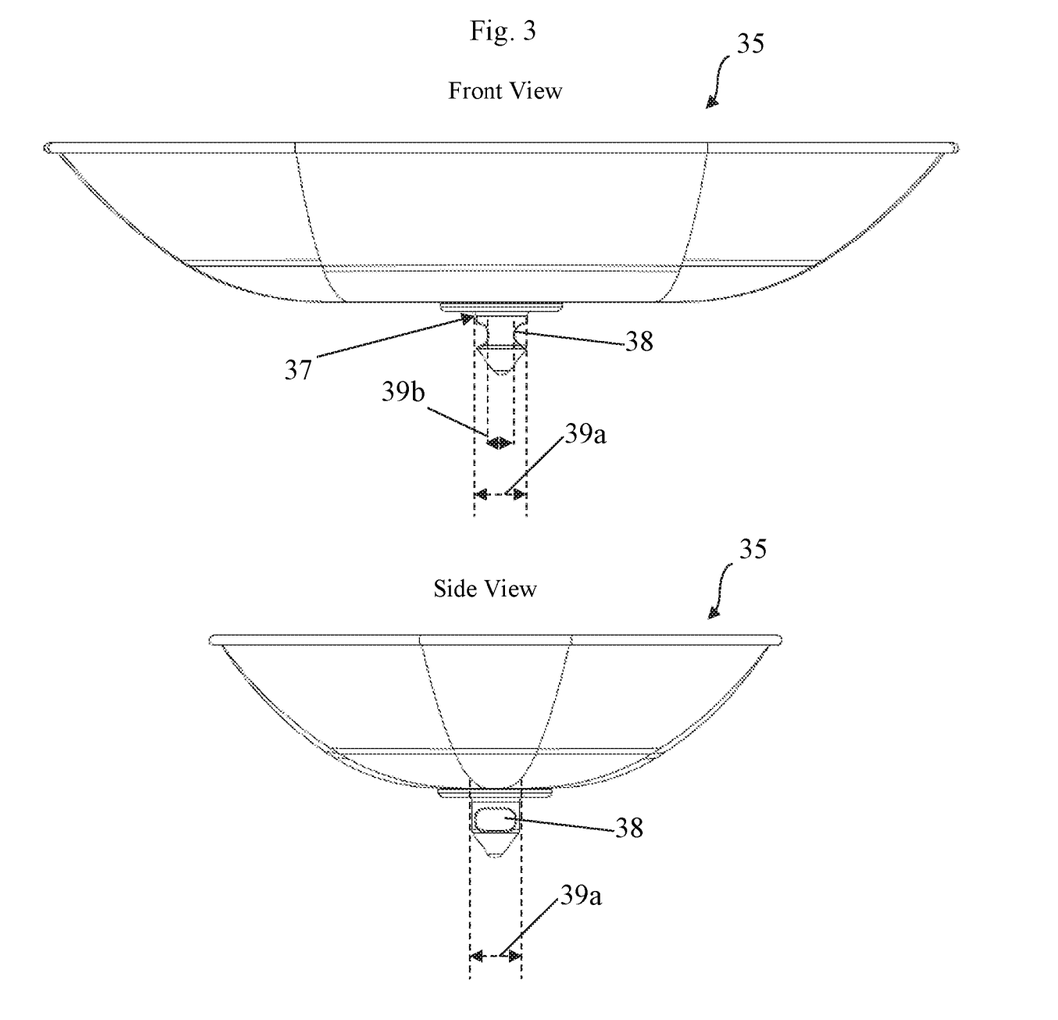
FIG. 3 is front and side view of the weighing plate or pan according to an option of the present invention.

A weighing plate 35, as shown in FIG. 3, for said weighing scale is configured for being supported by the carriage. During use, the locating pin 37 of the weighing plate or pan is inserted into the aperture of the cradle. Said locating pin is shaped so as to interlock with the weighing scale retaining system. To interlock with the weighing plate retaining system, the locating pin can comprise a narrowed portion 38, such as a notch. Alternatively, or additionally, the locating pin can comprise a wider portion such as a bulbous portion. In an option of the present invention, the locating pin interlocks with the weighing plate retaining system in a first orientation of the weighing plate with respect to the retaining system and is disengaged from the weighing plate retaining system in a second orientation of the weighing plate with respect to the retaining system. In a further option, the first orientation is offset from the second orientation by between 0 degrees and 180 degrees, preferably about 90 degrees.

Figure 4A:
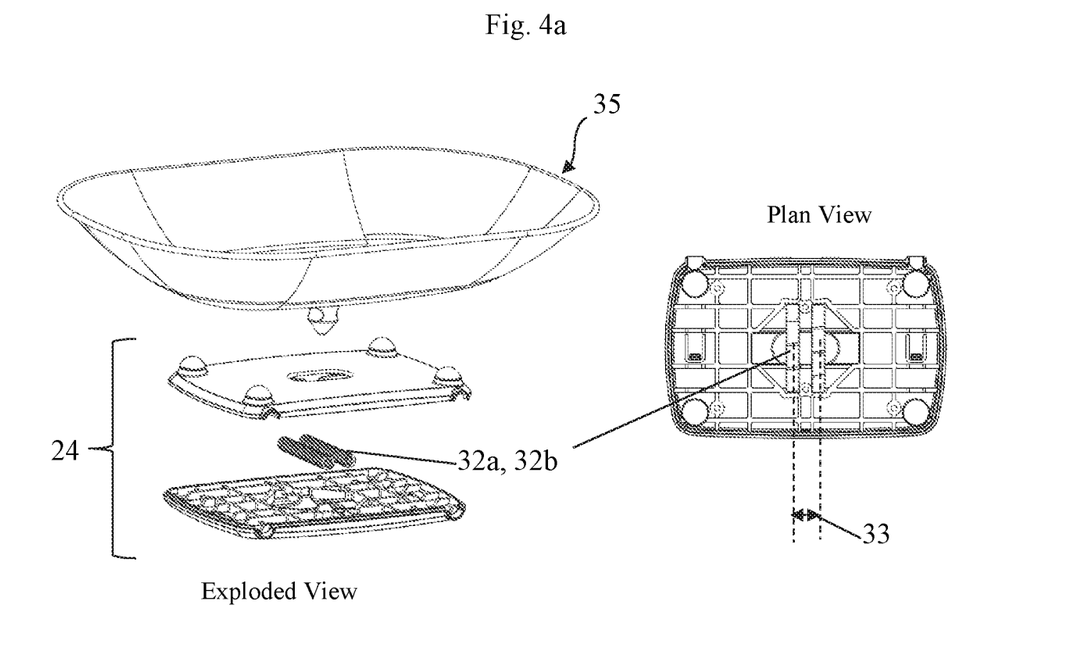
FIG. 4A is an exploded isometric representation of the cradle and weighing plate, wherein the weighing plate is in a first orientation in respect to the cradle, according to an option of the present invention.
Figure 4B:
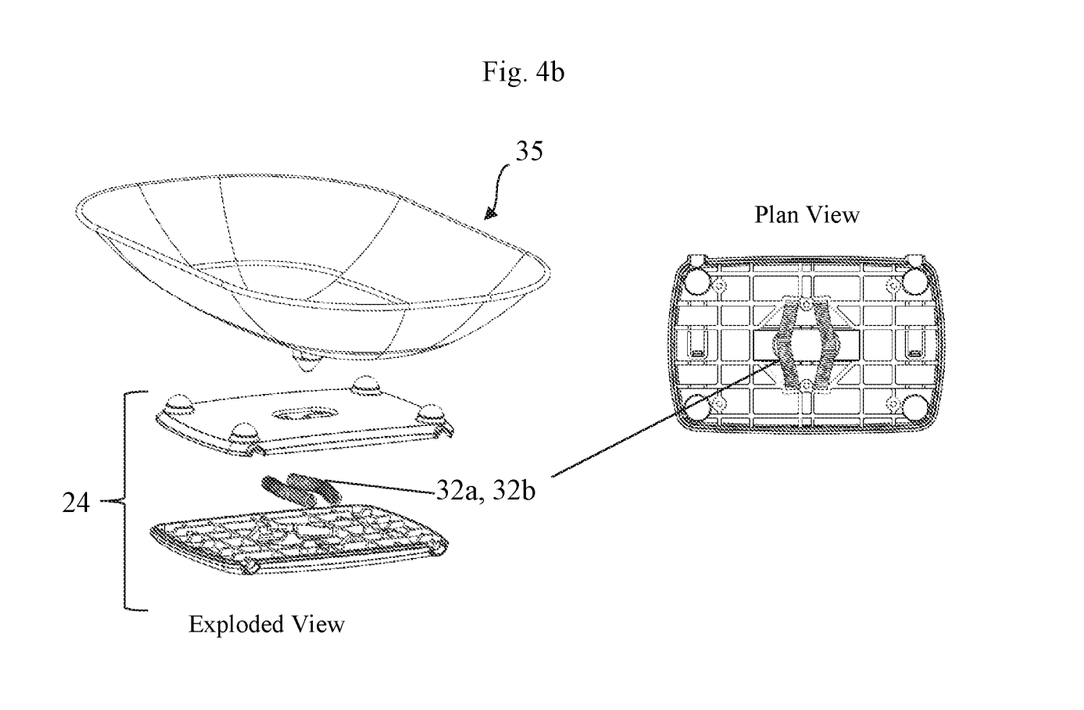
FIG. 4B is an exploded isometric representation of the cradle and weighing plate, wherein the weighing plate is in a second orientation in respect to the cradle, according to an option of the present invention.

In an option of the present invention wherein the at least one resilient member comprises spaced apart substantially parallel resilient members, the parallel resilient members are spaced apart by a distance 33 less than a greatest width 39a of the locating pin that extends into the weighing plate retaining system. In a further option said distance is equal to or greater than a smallest width 39b of the locating pin that extends into the weighing plate retaining system. The locating pin is shaped to comprise a cam surface such that when engaged within the resilient members, rotation of the locating pin causes the cam surface of the locating pin cooperate with the resilient members to cause the resilient members to be prised apart allowing for easy removal of the weighing plate or weighing pan from the retaining system. In FIG. 4B it can be seen that in the second orientation the resilient members are deformed, and the locating pin is no longer interlocked with the members, in comparison to the first orientation shown in FIG. 4A where the members cooperate with the notch in the locating pin to interlock and secure the weighing plate to the cradle.

In an option of the present invention, the locating pin is formed by 3D printing. In an option of the present invention the locating pin comprises but is not limited to plastics such as acetal or Nylon, or metals.

In an option of the present invention, the weighing plate retaining system can comprise one or more magnets for cooperating with a magnet within the locating pin of the weighing plate. The magnets correctly guide the weighing plate or pan in position on the cradle.

A benefit of the at least one resilient member of the weighing plate retaining system is that the weighing scale is resilient to knocks to the weighing plate from any direction since the at least one resilient member is able to absorb the knocks. Without said at least one resilient member, such that any knocks can potentially damage the load cell (or even disrupt the calibration of the load cell) if the resilient member is fixed to the load cell through the carriage or alternatively where the weighing plate is not detachably secured to the cradle (for example: if a plate merely rests on carriage without weighing plate retaining system), the weighing plate can become dislodged from the cradle causing spillage within the retail store, damaging produce and the weighing plate. The locating and interlocking functionality of the locating pin enables the case, cradle, carriage and weighing plate to be cleaned while ensuring that the weighing plate can be secured in the same orientation during each weighing of a load. Moreover, the ease of removal of the weighing plate or pan from the carriage allows the weighing plate or weighing pan to be easily replaced should the weighing pan become damaged or even contaminated.

Figure 5:
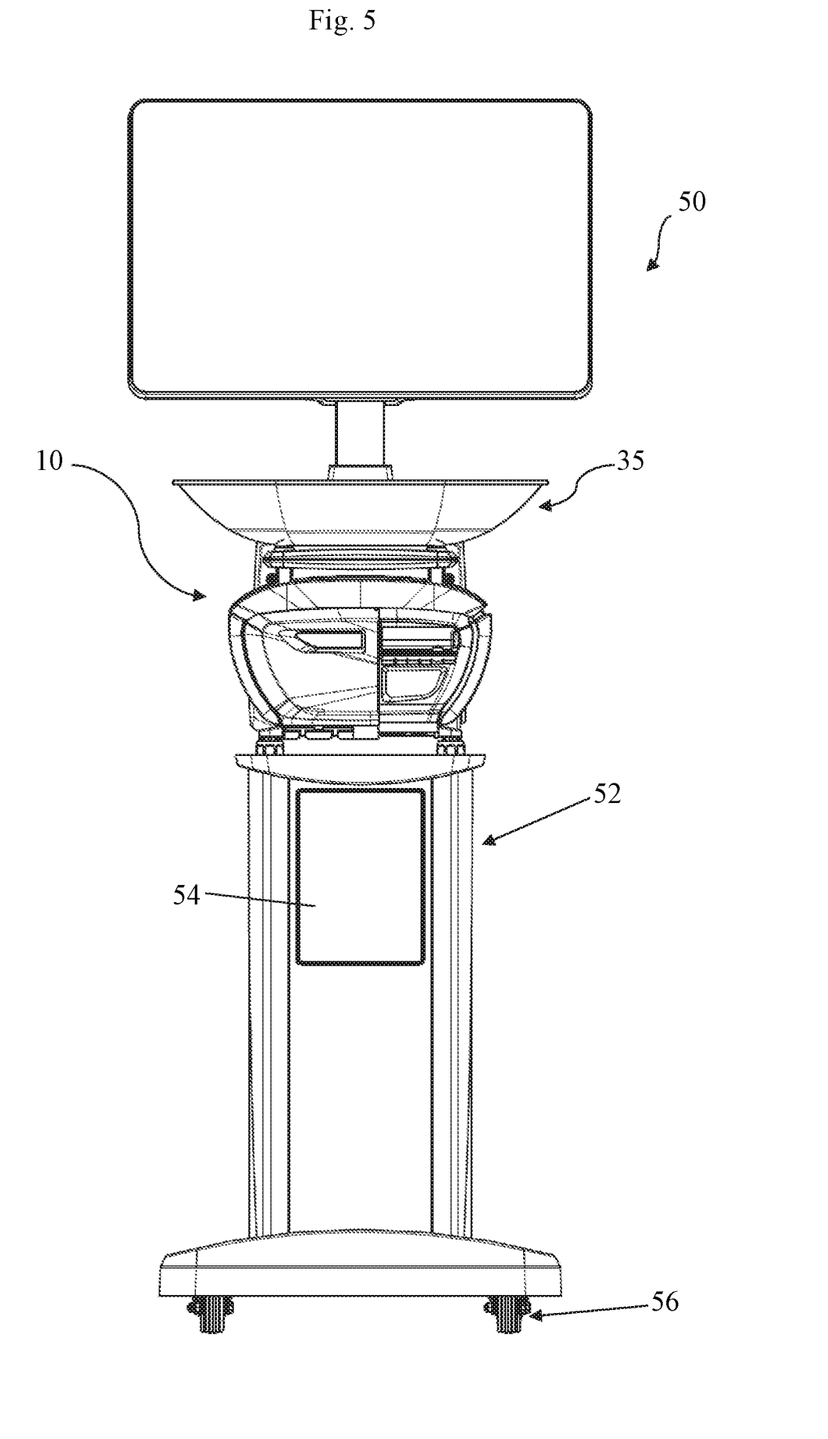
FIG. 5 is a front view of the weighing apparatus according to an example of the present invention.

The weighing scale of the first aspect of the present invention can be mounted on a pedestal 52 using any suitable fixing means to provide a weighing apparatus 50 as depicted in FIG. 5. Said pedestal can be a cart or trolley. Equally, the pedestal and the weighing scale can be formed as a unitary piece. The weighing scale mounted on the pedestal is not restricted to the weighing scale of the first aspect of the present invention; alternatively, the weighing apparatus can comprise a traditional weighing scale different to that described above. However, reducing the footprint of the weighing scale of the present invention enables the pedestal to be made much narrower in comparison to a traditional weighing scale. The weighing apparatus may optionally comprise an Uninterruptable Power Supply (UPS). The UPS is configured to provide the weighing apparatus with power from a battery, or other energy storage device, when disengaged from mains-power. The weighing apparatus is therefore capable of being positioned at innumerable locations, i.e. without being confined to a radius around a mains-power outlet; the weighing apparatus could therefore be described as wireless compared to conventional mains-powered weighing apparatus. By replacement or charging of the UPS, the weighing apparatus can be provided with power.

The pedestal optionally comprises a portion for storage 54, for example of the UPS and/or other accessories associated with the weighing apparatus such as additional label rolls, charging cables, etc. The portion can optionally be remotely lockable. In another option of the present invention, the pedestal comprises a movement means 56 configured to enable the pedestal and therefore the weighing scale to be moved from one location to another. The movement means can include, but is not limited to, rollers, casters, legs or a combination thereof. In the option of the present invention depicted in FIG. 5, the movement means comprises a set of casters. The weighing apparatus, in an option of the present invention, comprises a braking device to prevent movement of the pedestal once positioned and to provide stability. For example, but not limited to, a braking device can frictionally engage a surface below the pedestal or the braking device can frictionally engage the movement means to arrest movement thereof.

In an option of the present invention, the weighing apparatus comprises an optical article recognition (OAR) device (not shown). The OAR provides a means for automatic recognition of produce or goods to minimise operator input and to ensure operator fidelity where operator input is required (i.e. preforming checks on whether an operator selects the right produce for price calculation). The screen provides a means for displaying information for example on produce, operational status of weighing apparatus (such as power reserves) and on weighing scale status or set up.

In an additional aspect of the present invention, the weighing apparatus comprises a means for wireless communication, for example radio receivers/transmitters, Bluetooth, or WiFi. The wireless communications means can enable communication between back-office infrastructure to monitor, for example: stock levels, customer behaviour, label roll levels, weighing apparatus operational activity, power reserve or even location of the weighing apparatus. Additionally, the wireless communication device may be configured to enable control of a lockable storage portion.

In an option of the present invention, the weighing apparatus is configured to ensure that the apparatus is stable against tilting. For example, the centre of mass of the apparatus can be located at a position lower than half the total height of the weighing apparatus to provide increased stability. Alternatively, or additionally, the pedestal can be mounted on a platform having a width greater than the width of the pedestal.

In an option of the present invention, the weighing apparatus comprises a GPS device for enabling adjustment of calibration of the weighing scale in response to local changes in gravitational constant as for example described in GB 2459106 A (Illinois Tool Works, Inc) 14 Nov. 2009. After the GPS device determines the location of the weighing apparatus, this location is used to determine the local gravitation constant which is in turn used to calibrate the readings of weighing scale.

According to the present invention as shown in FIGS. 6 & 7, there is a need to provide the weighing apparatus, having a pedestal with movement means, with a stabilising device 60. The stabilising device is required to prevent movement of the movable weighing apparatus once positioned.

Each option presented in any of the above description can be combined with any other unless specifically disclosed as alternatives.

The following represent features of the present invention:
A. A weighing scale comprising:
a case for housing electrical components;
a load cell;
a carriage coupled to the load cell, wherein the carriage is configured for receiving a weighing plate;
wherein at least a portion of the carriage extends over the case.
B. The weighing scale of feature A comprising a user interface system.
C. The weighing scale of feature B, wherein the user interface system comprises a screen.
D. The weighing scale of feature C wherein the screen is a touch sensitive screen.
E. The weighing scale of any feature B to D, wherein the user interface system comprises a keypad.
F. The weighing scale of any preceding feature, wherein the case comprises electrical components.

G. The weighing scale of feature F, wherein the electrical components comprise at least one of: a printer, electronic storage, a central processing unit, a transducer.
H. The weighing scale of either feature F or G, wherein the electrical components comprise an inclinometer and a processor operative to allow for compensation of tilt of the weighing scale.
I. The weighing scale of any of the preceding features, wherein the carriage is arranged to support a weighing plate above the case.
K. The weighing scale of feature I, wherein the carriage comprising at least one arm extending from the load cell.
L. The weighing scale of feature K, where the at least one arm is spaced apart from an upper surface of the case.
M. The weighing scale of either feature K or L, wherein a cradle, for receiving a weighing plate, is coupled to the at least one arm.
N. The weighing scale of either feature L or M, wherein the at least one arm comprises a first arm and a second arm and the cradle is coupled between the first arm and the second arm.
O. The weighing scale of any feature M to N, wherein the cradle comprises at least one upwardly extending resting pin for stabilising the weighing plate on the cradle.
P. The weighing scale of any feature M to O, wherein the cradle comprises an aperture for locating the weighing plate onto the cradle.
Q. The weighing scale of feature P, wherein the aperture comprises a retaining system for interlocking with a locating pin of the weighing plate.
R. The weighing scale of feature Q, wherein the weighing plate retaining system comprises at least one resilient member configured for receiving the locating pin of the weighing plate.
S. The weighing scale of feature R, wherein the at least one resilient member comprises spaced apart substantially parallel resilient members.
T. The weighing scale of feature S, wherein the at least one resilient member is a spring.
U. The weighing scale of any preceding feature, comprising a weighing plate configured for being received by the carriage.
V. The weighing scale of feature U, wherein the weighing plate comprises a locating pin for being inserted into the aperture of any of the features P to U.
W. The weighing scale of either feature U or V, wherein the locating pin is shaped so as to interlock with the weighing scale retaining system of any of the features Q to T.
X. The weighing scale of feature W, wherein the locating pin interlocks with the weighing plate retaining system in a first orientation of the weighing plate and disengages from the weighing plate retaining system in a second orientation of the weighing plate.
Y. The weighing scale of features W or X, wherein the locating pin comprises a notch for interlocking with the weighing plate retaining system.
Z. the weighing scale of any preceding feature, wherein the load cell is a cantilever load cell.
AA. A movable weighing apparatus comprising:
the weighing scale of any preceding features mounted on a pedestal;
wherein the pedestal comprises movement means configured to enable the weighing apparatus to be moved from one location to another.

AB. The movable weighing apparatus of feature AA, wherein the movement means comprises rollers, casters, legs or a combination thereof.

AC. The movable weighing apparatus of either feature AA to AB, wherein the pedestal comprises at least one storage portion.

AD. The movable weighing apparatus of feature AC, wherein at least one of the at least one storage portions are lockable.

AE. The movable weighing apparatus of any feature AA to AD, comprising an Uninterrupted Power Supply (UPS) for supplying power to the weighing scale in absence of connection to mains-power.

AF. The movable weighing apparatus of feature AE, wherein the UPS is configured for storage within a portion of the pedestal.

AG. The movable weighing apparatus of any feature AA to AF, wherein the apparatus comprises a retractable stabilising device to prevent motion of the weighing apparatus.

The invention claimed is:

1. A weighing scale comprising:
a case for housing electrical components;
a load cell;
a carriage coupled to the load cell, wherein the carriage is configured for receiving a weighing plate;
wherein at least a portion of the carriage extends over the case;
a cradle coupled to the carriage, the cradle including a locating aperture;
a weighing plate supported on the cradle, the weighing plate including a locating pin inserted the locating aperture on the cradle.

2. The weighing scale of claim 1, wherein the carriage is arranged to support a weighing plate above the case.

3. The weighing scale of claim 2, wherein the carriage comprising at least one arm extending from the load cell.

4. The weighing scale of claim 3, where the at least one arm is spaced apart from an upper surface of the case.

5. The weighing scale of claim 3, wherein the cradle is coupled to the at least one arm.

6. The weighing scale of claim 1, wherein the locating aperture comprises a retaining system for interlocking with a locating pin of the weighing plate.

7. The weighing scale of claim 6, wherein the weighing plate retaining system comprises at least one resilient member configured for receiving the locating pin of the weighing plate.

8. The weighing scale of claim 7, wherein the at least one resilient member comprises spaced apart substantially parallel resilient members.

9. The weighing scale of claim 1, wherein the load cell is a cantilever load cell.

10. The weighing scale of claim 1, wherein the locating pin is shaped so as to interlock with a retaining system in the locating aperture.

11. The weighing scale of claim 10, wherein the locating pin interlocks with the retaining system in a first orientation of the weighing plate and disengages from the retaining system in a second orientation of the weighing plate.

12. The weighing scale of claim 11 wherein the weighing plate includes an upright vertical axis, the second orientation is rotated by about ninety degrees relative to the first orientation about the upright vertical axis.

13. A moveable weighing apparatus comprising:
the weighing scale of claim 1 mounted on a pedestal;
wherein the pedestal comprises movement means configured to enable the weighing apparatus to be moved from one location to another.

14. A weighing scale comprising:
a case housing electrical components;
a cantilever load cell in or on the case;
a carriage including at least one arm coupled to and extending from the cantilever load cell, wherein the cantilever load cell is configured to deform when a load is applied to the carriage;
a weighing plate or pan supported on the carriage;
wherein the at least one arm extends over the case and is spaced apart from an upper surface portion of the case to permit the carriage to freely deflect when a weight is placed on the weighing plate or pan.

15. The weighing scale of claim 14, wherein a cradle is coupled to the at least one arm, and wherein the weighing plate or pan is coupled to the cradle.

16. The weighing scale of claim 15, wherein the cradle includes an aperture, and the weighing plate or pan is coupled into the aperture of the cradle.

17. The weighing scale of claim 16, wherein the aperture includes at least one resilient member, and the weighing plate or pan includes a locating pin engaged with the resilient member.

18. The weighing scale of claim 17, wherein the at least one resilient member comprises spaced apart substantially parallel resilient members.

19. The weighing scale of claim 16, wherein the aperture includes a retaining system, and the weighing plate or pan includes a locating pin engaged with the retaining system, wherein the locating pin interlocks with the retaining system in a first orientation of the weighing plate or pan and disengages from the retaining system in a second orientation of the weighing plate or pan.

* * * * *

UNITED STATES PATENT AND TRADEMARK OFFICE
CERTIFICATE OF CORRECTION

PATENT NO. : 10,788,357 B2
APPLICATION NO. : 15/928721
DATED : September 29, 2020
INVENTOR(S) : Cartwright et al.

It is certified that error appears in the above-identified patent and that said Letters Patent is hereby corrected as shown below:

In the Claims

In Claim 1, at Column 9, Line 32 reads:
"plate including a locating pin inserted the locating"
It should read:
--plate including a locating pin inserted in the locating--

Signed and Sealed this
Twenty-fourth Day of November, 2020

Andrei Iancu
*Director of the United States Patent and Trademark Office*